United States Patent [19]

Hope et al.

[11] Patent Number: 4,808,496

[45] Date of Patent: * Feb. 28, 1989

[54] ELECTRODE CONSTRUCTION FOR SOLID STATE ELECTROCHEMICAL CELL

[75] Inventors: Henry F. Hope; Stephen F. Hope, both of Huntingdon Valley, Pa.

[73] Assignee: MHB Joint Venture, Dayton, Ohio

[*] Notice: The portion of the term of this patent subsequent to Mar. 18, 2003 has been disclaimed.

[21] Appl. No.: 25,475

[22] Filed: Mar. 13, 1987

[51] Int. Cl.[4] .............................................. H01M 6/18
[52] U.S. Cl. .................................... 429/192; 429/218; 429/209
[58] Field of Search ..................... 429/192, 215–217, 429/191, 193, 218, 199, 209, 40, 42, 44

[56] References Cited

U.S. PATENT DOCUMENTS

| | | | |
|---|---|---|---|
| 4,258,109 | 3/1981 | Liang et al. | 429/191 |
| 4,357,401 | 11/1982 | Andre et al. | 429/192 |
| 4,444,857 | 4/1984 | Duchange et al. | 429/191 |
| 4,471,037 | 9/1984 | Bannister | 429/192 X |
| 4,496,638 | 1/1985 | Sugiuchi | 429/192 |
| 4,520,086 | 5/1985 | Skotheim | 429/192 |
| 4,576,882 | 3/1986 | Davis et al. | 429/192 |
| 4,576,883 | 3/1986 | Hope et al. | 429/215 X |

Primary Examiner—Anthony Skapars
Attorney, Agent, or Firm—Z. T. Wobensmith, III

[57] ABSTRACT

Electrodes for a solid-state battery at least one of which comprises a layer of ionic and electronic conductive polymer spheres. Each polymer sphere consists of an active electrode material core encapsulated in an ionically and electronically conductive polymeric material.

14 Claims, 1 Drawing Sheet

ELECTRODE CONSTRUCTION FOR SOLID STATE ELECTROCHEMICAL CELL

BACKGROUND OF THE INVENTION

1. Field of the Invention

The invention is directed to a novel electrode construction for an all-solid state electrochemical cell. In particular, the invention is directed towards the electrodes of a multilayer electrochemical cell having a polymeric electrolyte layer, the electrodes including a cathode layer and a lithium layer or lithium alloy anode layer.

DESCRIPTION OF THE PRIOR ART

2. Electrochemical cells and batteries have been constructed from a wide variety of materials. Both the electrodes and the dielectric layer have been made from plastic, metal, and many other substances. The electrolyte has usually been a liquid, but solid material, such as polymers, are now preferred in battery construction.

A solid state battery will avoid many of the problems commonly associated with liquid electrolyte cells. Such problems include electrolyte leakage, dryout, anode passivation, and dendrite formation. In addition, the use of all solid state components simplifies fabrication of the cell and leads to a mechanically stable device. Operation at moderate temperature overcomes the severe problems of corrosion and sealing associated with high temperature fused salt electrolyte or molten electrode systems. Clearly a solid state battery is preferable for many applications, to a battery containing liquid electroltyte or electrolyte paste.

It has been preferred when fabricating lithium batteries to use a polymer/inorganic composite in both the cathode layer and the electrolyte layer, which layers may be formed as a film by continuous casting and solvent evaporation. Using this method, large area membranes of 25–50 micrometer thickness may be routinely fabricated. This technique, commonly referred to as the "doctor-blade" technique, results in electrolyte layers which are substantially pinhole-free, retain their integrity over many cycles, and provide excellent interfacial characteristics.

Recent joint studies conducted by the Harwell Laboratory/United Kingdom and the Energy Research Laboratory of/Denmark have focused upon lithium batteries employing a polymer electrolyte composed of polyethylene oxide compounded with various lithium salts. In these cells, the cathode material is based on $V_6O_{13}$ and the preferred anode consists of a lithium metal foil or a lithium/aluminum foil. Specifically, the cathode is a composite structure formed by intimately mixing premilled vanadium oxide with acetylene black, in an electrolyte solution. The electrolyte solution contains polyethylene oxide polymer. The resulting cathode layer, when deposited as a film, consists of a random agglomerate of particles of polymer, carbon, and vanadium oxide. It is reported that the lithium cells so constructed showed improved performance in terms of current density, material utilization, and reproduceability. It is suggested that these cells may have application in the production of vehicle traction batteries. See, Hooper, A. et al., Advanced Battery Development (Odense University Press, 1984).

SUMMARY OF THE INVENTION

It has now been found that the performance characteristics of the above-described lithium based cells may be dramatically increased by the use of a novel electrode construction. In particular, the present invention is directed towards composite electrodes which have increased surface area, increased performance characteristics, and increased life.

These objectives are achieved by forming one or more of the electrode layers of the solid-state battery as a layer of polymer-encapsulated active electrode material spheres. The encapsulation material is a polymer, preferably polyethylene oxide which is ionic and electronic conducting. This may be done by adding carbon to the polymer for electronic conductivity and lithium salt for lithium ionic conductivity. The spheres, in the form of an emulsion, may be applied as a layer to an electrically conductive substrate.

DESCRIPTION OF THE DRAWINGS

The nature and characteristic features of the invention will be more readily understood from the following description taken in connection with the accompanying drawings forming part hereof in which.

Figure 1:
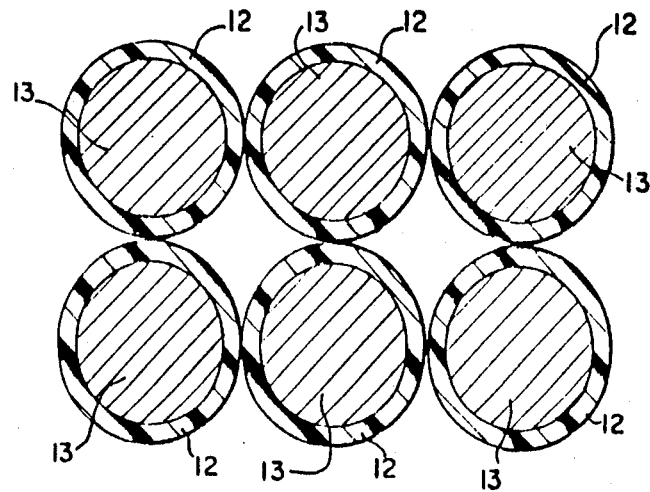
FIG. 1 shows the polymer spheres of the invention as they exist in a layer, i.e. in each sphere in contact with neighboring spheres to form an electronic and ionic conducting network.

It should, of course, be understood that the description and drawings herein are illustrative merely and that various modifications and changes can be made in the structure disclosed without departing from the spirit of the invention.

DESCRIPTION OF THE INVENTION

An all solid-state electrochemical cell which consists of two electrodes which are an anode layer, a cathode layer and has a polymer electrolyte layer therebetween. The three-layer structure, in the form of a sheet, roll, or tape, etc. forms a simple cell or battery. Such structures can employ various additional layers, including current conducting backing layers, insulating layers, and/or bipolar electrode connections. Such simple batteries may be connected or combined in stacks to form multi-cell electrochemical devices.

Typically, electrochemical cells are formed as simple disc sandwiches. However, large area cells may be fabricated using a "swiss-roll" technique around a central mandrel, or a "concertina" configuration, sandwiched between two stainless steel plates. Both of these methods are well-known to the artisan.

In the preferred embodiment of the invention the cathode and electrolyte layers of the laminate can be produced from the appropriate polymer film using the so-called "doctor-blade" technique. According to this method, a solution of the polymer (or polymer compounded with inorganic material) is prepared in a suitable solvent and, for example, cast as a film onto a sheet of waxed paper as it is passing beneath a fixed reservoir positioned at one end of a flat platform. The front face of the reservoir is adjustable in height and the setting of the gap between the doctor-blade and the paper sheet determines the thickness of the cast film. Evaporation of the solvent causes a uniform reduction in film thickness by an amount which is dependent on the concentration of the solution. This technique of creating a thin film layer is familiar to those skilled in the art, and can be used to form very thin films of approximately 25–50 micrometer thickness.

The anode layer used in lithium batteries usually comprises a lithium metal foil or a lithium/aluminum alloy foil. In electrochemical lithium cells a battery grade lithium foil of 350 micrometer thickness has previously been used. Use of this foil represents a large excess of lithium and it is preferable to use a thin anode in the form of a lithium/aluminum alloy formed by a cathodic reduction of aluminum foil in a lithium salt solution. Lithium deposited on the surface of the foil is allowed to accumulate to a thickness of 10 to 20 micrometers on the surface of the aluminum foil. The structural integrity of the anode layer is maintained by allowing more than one half of the thickness of the aluminum foil to be unconverted.

Lithium on copper foils, for example, an 80 micrometer copper foil with a 20 micrometer lithium layer, will also serve as a satisfactory anode. Both of these anode structures are compatible with the construction of large area, thin film cells.

The polymeric electrolyte composition is formed by compounding a salt and a polymeric material such as polyethylene oxide. Salts and polymers useful in this invention are described in U.S. Pat. No. 4,303,748 to Armand. Preferred salts are lithium or sodium salts of anions selected from the group consisting of $I^-$, $BR^-$, $SCN^-$, $ClO_4^-$, $BG_4^-$, $PR_6^-$, $AsF_6^-$, $CF_3CO_2^-$, and $CF_3SO_3$. Polymers useful in the present invention include those having an anionic group covalently bonded to the polymer chain as described in U.S. Pat. No. 4,556,615, and the atactic polyether having a glass transition temperature less than 0° C. as described in U.S. Pat. No. 4,471,037.

Polyethylene oxide and lithium salt are compounded, for example, by milling the heated polymer with crystals of lithium perchlorate, to achieve substantially uniform mixing. Alternatively, a solvent is combined with the polymer to improve its film-forming qualities and the salt introduced into the polymer in solution. The resulting mixture may be desposited as a film directly onto the cathode layer of the cell. The mixture is applied by the doctor-blade technique referred to previously. This leads to good reproducibility of the electrolyte layer, which is optimally in the order of 25 micrometers.

The cathode layer is a composite layer, and as formed in accordance with the invention, consists of a thin layer of polymer spheres and interposed electrolyte composition. At the core of each polymer sphere is the active cathode electrode material. The active cathode electrode material is an intercalation or insertion metal compound. Typical examples are transition metal oxides, sulfides, and selenides, however, the active electrode material can be any suitable material useful in both primary and secondary batteries, such as $V_6O_{13}$, $TiS_2$, $MnO_2$, $MoS_3$, $Cr_3O_6$, $Li_xV_3O_8$, $V_3O_8$, and $V_2O_5$. The preferred materials are vanadium oxides such as $V_2O_5$ and $V_6O_{13}$, the preferred vanadium oxide compound is $V_6O_{13}$ which is prepared by the thermal decomposition of ammonium metavanadate, and has an average agglomerated particle size of 1–5 microns. The agglomerates can be further ground to reduce the particle size to the order of less than one micron.

The finely ground $V_6O_{13}$ particles are encapsulated within conductive polymer to form spheres, as illustrated in FIG. 1. Referring to FIG. 1, polymer spheres 10 are illustrated which consist of a vanadium oxide core 13 encapsulated with electronic and ionic conductive polymer material 12. The preferred conductive polymer consists of polyethylene oxide containing an inorganic salt to render the polymer ionically conductive, and carbon black to render the polymer electronically conductive.

Inorganic salts which are preferred are of the types and amounts employed in the electrolyte layer of lithium batteries, and include $LiClO_4$, $NaClO_4$, $LiF_3CSO_3$, and $LiBF_4$. Carbon or acetylene black is added to the polymer, to approximately 5% by weight, to provide electrical conductivity.

The primary advantage of the polymer spheres of the present invention is a large increase in the available active surface area of the cathode. Also, the active cathode electrode material is mechanically fixed within each sphere, which increases the active life of the cathode layer. Further, since each sphere is in contact with other conductive spheres, an electronic conductive network or grid exists across and through the cathode, as shown in FIG. 1. The voids existing between the spheres allow diffusional access to any part of the cathode layer.

Several methods may be used to form the spheres. They may be prepared by forming an emulsion using the polyethylene oxide polymer as a binder. The polymer may be compounded with a suitable lithium salt and carbon black prior to its introduction into the emulsion.

The compounded polymer and finely divided active electrode material such as $V_6O_{13}$ are emulsified in a suitable organic solvent. As a result, each sphere or agglomerate of electrode material becomes encapsulated by polymer and retains the resulting spherical form within the emulsion. Accordingly, when the emulsion is applied as a thin film and the solvent removed, a layer of spheres is deposited on the substrate. The film may be applied, for example, by the "doctor-blade" method, and the resulting film may be of any desired thickness.

While the encapsulated polymer spheres have been described for use in the cathode layer, the same principle may be applied to the anode electrode layer. If it is desired to encapsulate the lithium of the anode layer of a lithium cell, then the lithium is prepared in finely ground form by many well known techniques, such as spray drying, with the resultant spheres of the same size as described for the active cathode electrode material.

The finely ground particles or spheres of lithium are encapsulated and deposited on an aluminum substrate as described above for the cathode electrode layer.

Figure 2:
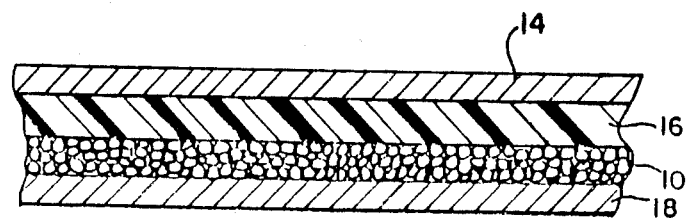
FIG. 2 shows a solid state lithium battery employing a layer of polymer spheres as the cathode.

Referring now to FIG. 2, a solid state electrochemical cell which embodies the preferred embodiment of the invention is shown. Layer 14 corresponds to the anode electrode layer, which may consist of a lithium or lithium/aluminum foil. The layer shown as 16 corresponds to the electrolyte layer, which preferably consists of polyethylene oxide and an inorganic salt. Layer 10 comprises the cathode electrode layer which is formed of a multiplicity of polymer spheres and the electrolyte composition as disclosed herein. Layer 18 represents a current-collecting base layer, which may, for example, consist of a nickel or copper foil.

The 4-layer laminate shown in FIG. 2 may be prepared as a continuous sheet or roll, and preferably, one layer is laminated directly onto the underlying layer in a continuous process.

In a preferred embodiment of the invention, additional ionically conductive polyethylene oxide is applied to the layer of spheres, to form a matrix around the spheres, and fill the voids therebetween. This increases the mechanical stability of the layer and provides improved diffusional properties.

In this example, it was preferable in this example to employ vanadium oxide of approximately 50%, by volume, of the total cathode, including the added matrix material.

When forming a lithium battery, it is preferred to deposit the cathode layer directly onto the current-collecting base layer. Accordingly, in the described embodiment, the emulsion of polymer spheres may be applied directly to the foil base as a thin layer.

The following example illustrates the encapsulation of an insertion compound by spray drying.

EXAMPLE

The attritor used was a small laboratory attritor with 1857 g of 5 mm diameter steel balls. One quarter of the steel balls was placed into the attritor, then 100 g $V_6O_{13}$ and 100 g of a 2% poly(ethylene oxide) solution (M.W. 400,000) in 1,1,1-trichloroethane were added as well as the remaining steel balls and the attritor driven at a 100 volt setting on the autotransformer and a temperature of about 21° C. (controlled by water jacket) for 70 minutes. Then 2.86 g of lithium trifluoromethane sulfonate was added together with an additional 30 ml of the chlorinated solvent. Grinding was continued for 280 minutes after which time 5.00 g acetylene black (Chevron 50% compressed) was added. After 70 minutes more grinding the run was stopped and 300 g 1,1,1-trichloroethane was added. 30.37 g of the above attritor grind slurry was blended with 68.60 g of 2% poly(ethylene oxide), (400,000 M.W.) in 1,1,1-trichloroethane and 0.54 g additional acetylene black. This mixture was spray dried after dilution to a total of 600 g with 1,1,1-trichloroethane. The composition of the spray dried particles is given below:

| Component | Weight (g) | % by Weight (dry) |
|---|---|---|
| $V_6O_{13}$ | 5.833 | 70.00 |
| Acetylene Black | 0.833 | 10.00 |
| $LiCF_3SO_3$ | 0.167 | 2.00 |
| PEO | 1.500 | 18.00 |

The spray dryer feed slurry has 1.39% solids, and the PEO concentration was 0.25%. The resulting particles were shown by scanning electron microscopy to have diameters of 2-20 microns and showed clearly visible carbon particles on the shells.

It will thus be seen that an electrochemical cell has been provided in accordance with the objects of the invention.

We claim:

1. A solid state electrochemical cell having at least two electrodes, one of which is an anode and one of which is a cathode, and a polymeric electrolyte, wherein at least one of said electrodes is comprised of a multiplicity of spheres, each sphere consisting of an active electrode material core encapsulated in an electronic and ionic conducting polymer film forming an electronic and ionic conducting network.

2. A solid state electrochemical cell as defined in claim 1 in which
   said electrode which is comprised of said spheres is said cathode.

3. A solid state electrochemical cell as defined in claim 1 in which
   said electrode which is comprised of said spheres is said anode.

4. The solid state electrochemical cell of claim 2 wherein said active electrode material is a transition metal oxide, sulfide, or selenide.

5. The solid state electrochemical cell of claim 4 wherein said active electrode material is a vanadium oxide.

6. The solid state electrochemical cell of claim 5 wherein said electronic and conductive polymer includes an ionically conductive salt and an electronically conductive filler.

7. The solid state electrochemical cell of claim 6 wherein said electronically conductive filler is carbon black.

8. The solid state electrochemical cell of claim 6 wherein said salt is a lithium, sodium, potassium, or ammonium salt.

9. The solid state electrochemical cell of claim 8 wherein said salt is a salt of an ion selected from the group consisting of $I^-$, $Br^-$, $SCN^-$, $ClO_4^-$, $BF_4^-$, $PF_6^-$, $AsF_6^-$, $CF_3CO_2^-$, and $CF_3SO_3^-$.

10. The solid state electrochemical cell of claim 9 wherein said salt is a lithium salt.

11. The solid state electrochemical cell of claim 10 wherein said polymer is polyethylene oxide.

12. The solid state electrochemical cell of claim 1 wherein said anode is a lithium or lithium alloy anode.

13. The solid state electrochemical cell of claim 1 wherein said polymeric electrolyte comprises a salt and a polymer, and said salt and said polymer are present in said ionically and electronically conductive film encapsulating said active electrode material.

14. The solid state electrochemical cell of claim 3 in which said active electrode material is lithium.

* * * * *